United States Patent [19]

Iimura et al.

[11] Patent Number: 5,601,018
[45] Date of Patent: Feb. 11, 1997

[54] AUTOMATIC STAMPING DEVICE

[75] Inventors: Tomohiko Iimura; Hitoshi Ejima, both of Saitama, Japan

[73] Assignee: Fuji Xerox Co., Ltd., Tokyo, Japan

[21] Appl. No.: 677,906

[22] Filed: Jul. 10, 1996

Related U.S. Application Data

[63] Continuation of Ser. No. 417,262, Apr. 5, 1995, abandoned.

[30] Foreign Application Priority Data

Jun. 30, 1994 [JP] Japan ................... 6-172012

[51] Int. Cl.⁶ ........................................ B41J 5/00
[52] U.S. Cl. ........................................ 101/45; 399/1
[58] Field of Search ....................... 101/18, 13, 29, 101/42, 45, 327, 368, 109; 355/112, 202, 308; 400/76, 103; 358/450, 453

[56] References Cited

U.S. PATENT DOCUMENTS 5,126,858  6/1992  Kurogane et al. ............... 358/450

FOREIGN PATENT DOCUMENTS

0478351A2  4/1992  European Pat. Off. .
62-63166   4/1987  Japan .
1198177    8/1989  Japan .
2159875    6/1990  Japan .

*Primary Examiner*—Ren Yan
*Attorney, Agent, or Firm*—Finnegan, Henderson, Farabow, Garrett & Dunner, L.L.P.

[57] ABSTRACT

An automatic stamping device includes a document reading device 10 which reads a document and supplies the result of reading on an image memory 22, and a stamp memory control circuit 21 which produces various stamp image data on the basis of the number of documents or the number of sheets of paper already printed, etc. These image data are synthesized by an image synthesizing circuit 27 and outputted through an image printing device 40, thereby automatically making stamping on printed matters.

9 Claims, 5 Drawing Sheets

FIXED NUMBER (FIXED CHARACTER TRAIN OF DATE)

FIG. 5B

SET NUMBER (MANNER OF NUMBERING A SET OF GROUPS OF DOCUMENTS OUTPUTTED)

FIG. 6A

DOCUMENT NUMBER (MANNER OF NUMBERING DOCUMENT)

FIG. 6B

COPY NUMBER (MANNER OF SERIALLY NUMBERING SHEET OF PAPER OUTPUTTED)

AUTOMATIC STAMPING DEVICE

This application is a continuation of application Ser. No. 08/417,262, filed Apr. 5, 1995, now abandoned.

BACKGROUND OF THE INVENTION

1. Field of the Invention

The present invention relates to an automatic stamping device suited to copier machines.

2. Description of the Related Art

Figure 5A:
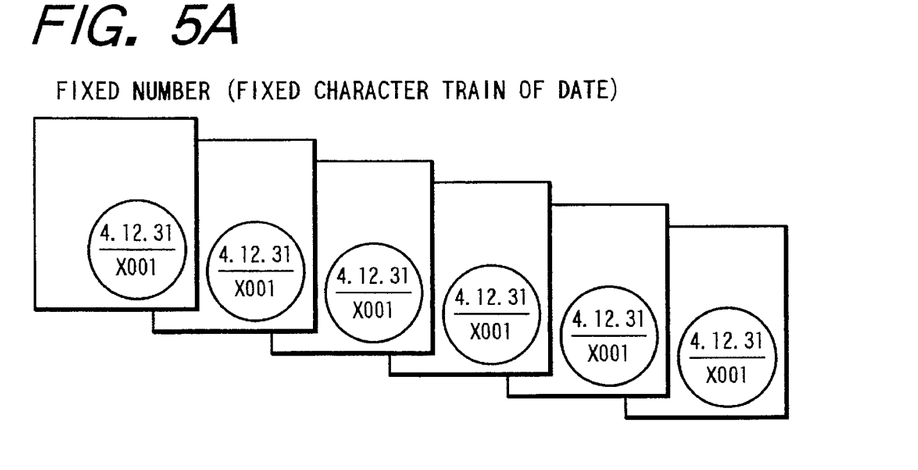
FIGS. 5A and 5B are diagrams showing an example of numbering for printed matters.
Figure 5B:
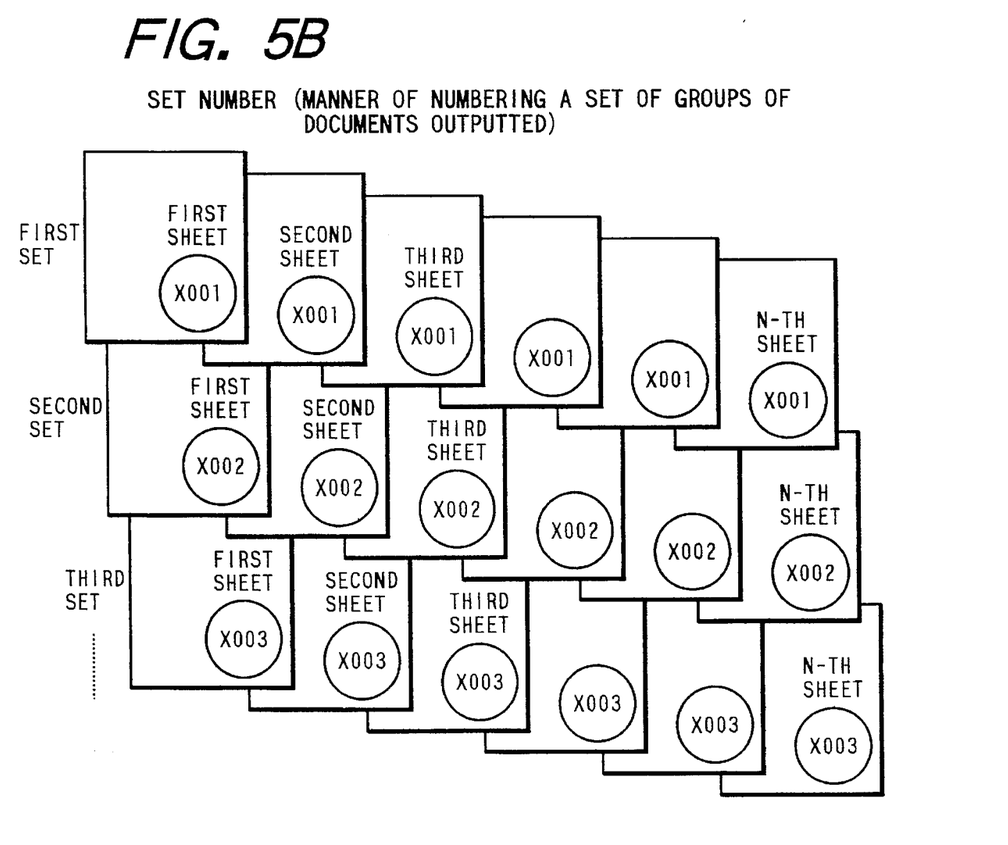
Figure 6A:
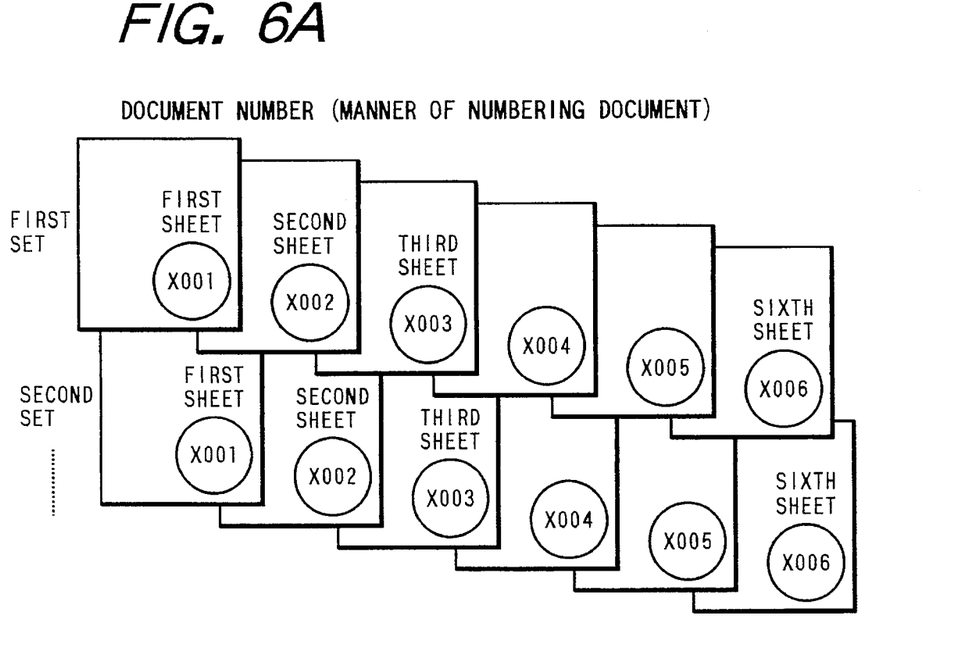
FIGS. 6A and 6B are diagrams showing an example of numbering for printed matters.

In order to arrange or manage printed matters produced from a copier or printer, they are stamped generally. Sometimes, the same stamp is made on all the printed matters, but at other times, the stamps should be made with different numbers (numbering information) according to e.g., the page numbers of the corresponding documents or the set numbers of the printed matters. Now, the expression "set" means a set of a group of produced documents, and the expression "set number" means the number given to each of the groups of documents. An example of the printed matters with the set numbers is shown in FIG. 5B. An example of the printed matters with document numbers (page numbers of documents) is shown in FIG. 6A.

In order to update the numbering information as described above, a mechanical type stamping device has been proposed in which a printing plate is rotated using the stamping force whenever stamping is done. Japanese Utility Model Unexamined Publication No. Sho 62-63166 discloses a technique in which the printed face is formed by a dot printer and numbering information is set by computer control.

In both the techniques described above, however, a man must make a stamp turning over the printed matters. This makes the operation troublesome and gives strong possibility of mistakes of numbering.

SUMMARY OF THE INVENTION

The present invention has been completed in view of the above circumstance, and an object of the invention is to provide an automatic stamping device which allows swift and correct stamping.

In order to solve the above problem, according to a first aspect of the invention, there is provided an automatic stamping device which comprises reading means for reading plural sheets of documents to output the result of reading as document image data; document counting means for counting the number of documents already read; stamp image data producing means for producing stamp image data including a frame line with a prescribed shape and a train of characters within said frame line, on the basis of the counting result of said document counting means; image data synthesizing means for synthesizing said document image data and said stamp image data to produce a printing image data; and image data outputting means for outputting the printing image data on a sheet of paper.

According to a second aspect of the invention, there is provided an automatic stamping device which comprises: reading means for reading a document to output the result of reading as a document image data; image data outputting means for successively outputting a printing image data supplied for each page to a sheet of paper; page number counting means for counting the number of pages of the image data supplied to said image data outputting means; stamp image data producing means for producing stamp image data including a frame line with a prescribed shape and a train of characters within said frame line, on the basis of the counting result of said page number counting means; and image data synthesizing means for synthesizing said document image data and said stamp image data to output the result of synthesizing as said printing image data.

According to a third aspect of the invention, an automatic stamping device according to the second aspect of the invention further comprises resetting means for resetting the counting result of said page number counting means to a predetermined initial value when a new document is read by said reading means.

In the automatic stamping device according to the first aspect of the invention, when the reading means reads plural sheets of documents to output the result of reading as document image data, the document counting means counts the number of documents already read. On the other hand, the stamp image data producing means produces stamp image data including a frame line with a prescribed shape and a train of characters within said frame line, on the basis of the counting result of said document counting means. The image data synthesizing means synthesizes said document image data and said stamp image data to produce printing image data. The image data outputting means outputs the printing image data on a sheet of paper. Thus, the stamps corresponding to the number of documents are printed on the sheets of paper.

In the automatic stamping device according to the second aspect of the invention, the reading means reads a document to output the result of reading as document image data while the image data outputting means successively outputs printing image data supplied for each page to a sheet of paper. Then, the page number counting means counts the number of pages of the image data supplied to said image data outputting means, and the stamp image data producing means produces stamp image data including a frame line with a prescribed shape and a train of characters within said frame line, on the basis of the counting result of said page number counting means. The image data synthesizing means synthesizes said document image data and said stamp image data to output the result of synthesizing said printing image data. Thus, the stamping images corresponding to the page numbers of the outputted image data are printed on sheets of paper.

In the automatic stamping device according to the third aspect of the invention, the resetting means resets the counting result of said page number counting means to a predetermined initial value when a new document is read by said reading means. Thus, the stamping images according to "set numbers" are printed on sheets of paper.

The above and other objects and features of the present invention will be more apparent from the following description taken in conjunction with the accompanying drawings.

DETAILED DESCRIPTION OF THE PREFERRED EMBODIMENTS

Now referring to the drawings, a description will be given of the structure of an automatic stamping device according to one embodiment of the present invention.

Figure 1:
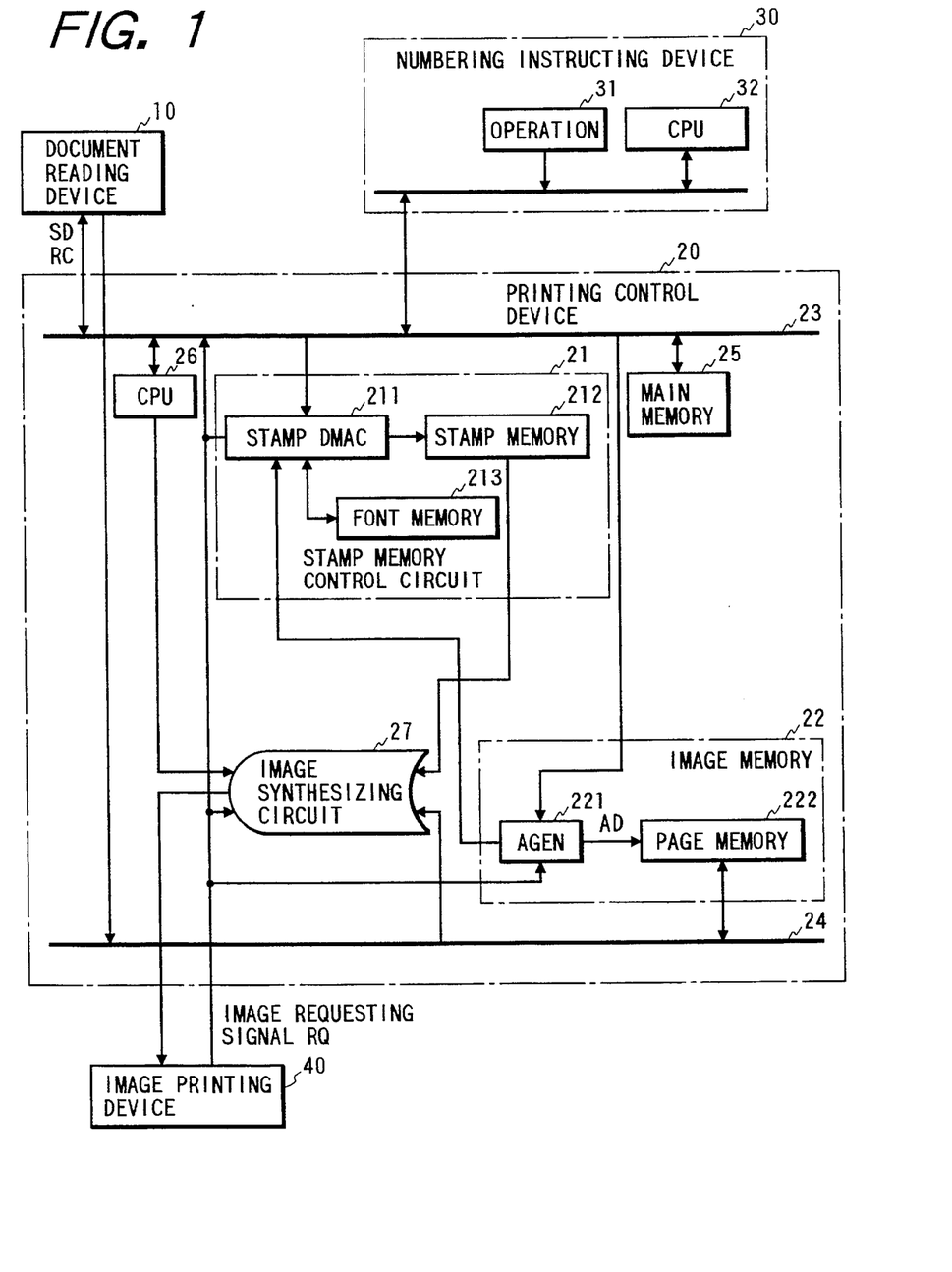
FIG. 1 is a block diagram showing an automatic stamping device according to one embodiment of the present invention.

In FIG. 1, a document reading device 10 reads a document using e.g., a CCD sensor to output its contents as a document image data and also output a control signal (image transmission starting signal SD). A CPU 26 provided within a printing control device 20 controls the other components on the basis of the control program stored in a main memory 25. An operation control bus 23 is used to transmit various control signals, and an image transfer bus is used to transmit the document image data.

An image memory 22 includes a page memory 222 for storing document image data and an address generator 221. The address generator 221 serves to supply to the page memory 222 an address signal AD incremented for each predetermined clock when it receives an image transmission starting signal SD through the operation control bus 23. Thus, the document image data supplied to the image memory 22 through the image transmission bus 24 are serially stored in the page memory 222.

Figure 4:
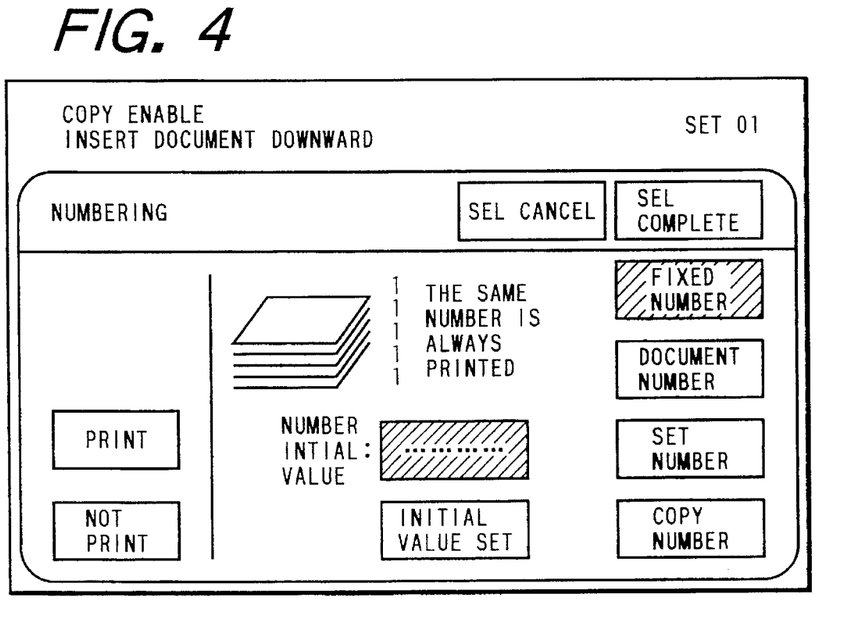
FIG. 4 is a diagram showing an example of the operation section.

A numbering instructing device 30 includes an operation section 31 and CPU 32. Through the operation section 31, an operator can specify the kind of numbering information and input its initial value. The operation section 31 includes an LCD display, a touch sensor provided on the LCD display, a keyboard, etc. On the LCD display, various messages and images of buttons are displayed. The operator can press down the pertinent button by a finger to input various data through the touch sensor. An example of the LCD display is shown in FIG. 4.

Figure 6B:
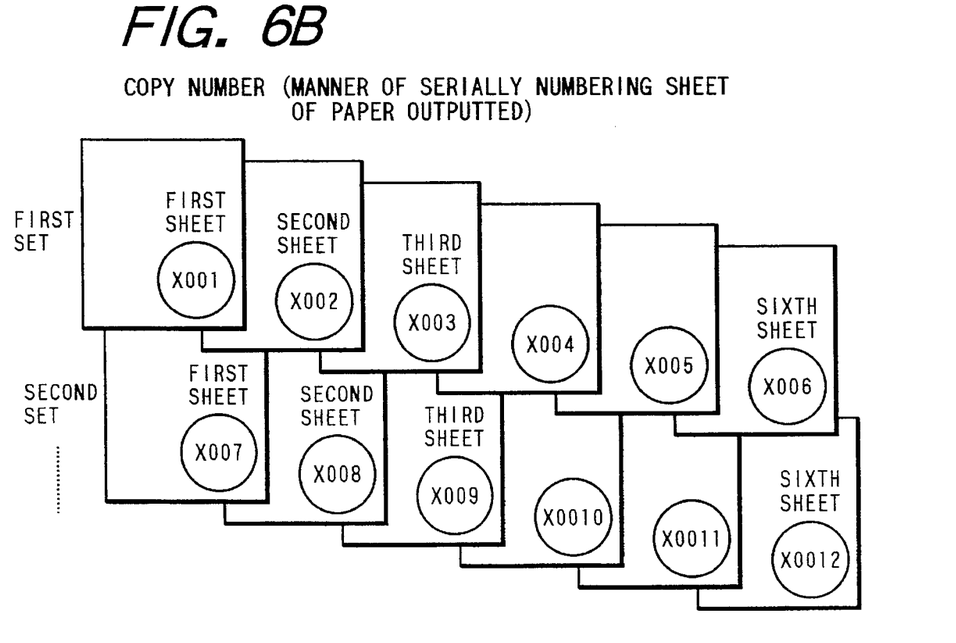

In this embodiment, the following four kinds of numbering information can be selected optionally:
(1) page number of a document
(2) set number of printed matters
(3) sheet number (copy number)
(4) fixed number Now, the expression "sheet number" means a number increased one by one for each sheet of paper. An example of the printed matters with stamps of sheet numbers is shown in FIG. 6B. The fixed number of (4) is a number common to all the sheets of paper such as stamping dates. The fixed number can be specified in combination with any of the above numbers of (1) to (3).

Figure 3:
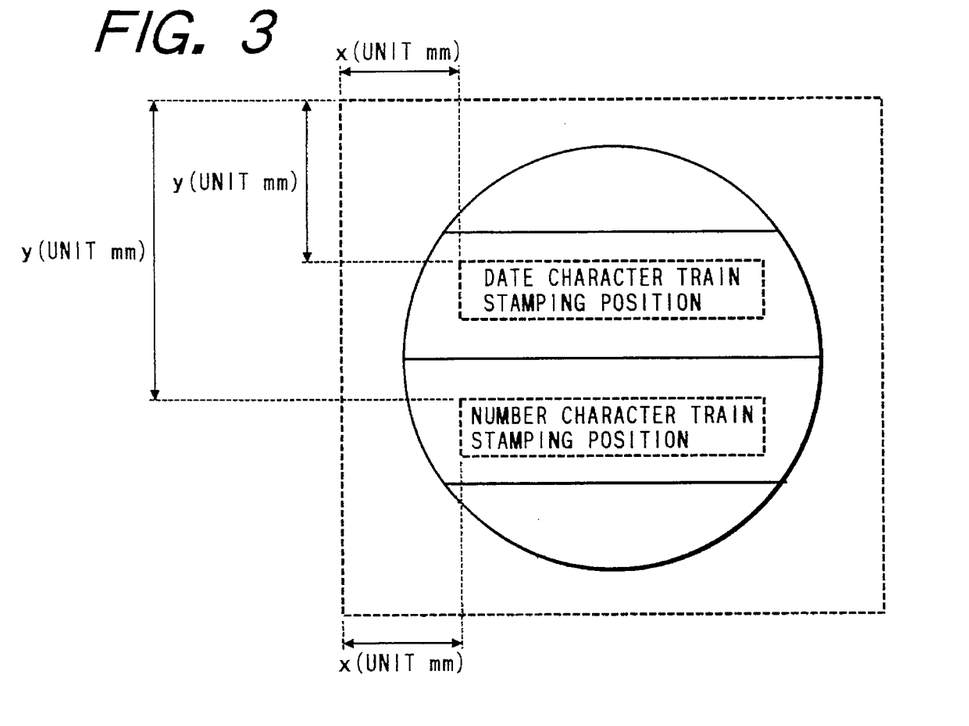
FIG. 3 is a diagram showing one example of a stamp image data.

A stamp memory control circuit 21 includes a stamp DMA controller 211. The stamp DMA controller 211, when it receives numbering information from the numbering instructing device 30 through the operation control bus 23, reads, from a font memory 213, the font corresponding to each of characters constituting the numbering information to produce a stamp image data. The stamp image data thus produced is stored in the stamp memory 212. Now the stamp image data is a stamp image data incorporating one or plural items of numbering information arranged within a circular frame line. Its one example is shown in FIG. 3. The numbering information shown in FIG. 3 includes an upper fixed number (stamp date) and a lower document page number (which can be replaced by the set number or sheet number of printed matters).

An image synthesizing circuit 27, when it receives the stamp image data from the stamp memory control circuit 21 and the document image data from the image memory 22, outputs both superimposed image data. An image printing device 40 prints the image data (printing image data) on a sheet of paper while receiving it from the image synthesizing circuit 27. The image printing device 40 produces an image requesting signal RQ upon completion of printing for each sheet of paper. The CPU 26, when it receives the image requesting signal RQ, updates the numbering information to be supplied to the stamp DMA controller 211. Therefore, in such a case, under the control by the stamp DMA controller 211, the font corresponding to new numbering information is read out and the stamp image data in the stamp memory 212 is updated.

The method of updating the numbering information varies with the kind of the selected numbering information. For example, when only the fixed number is selected as numbering information (see FIG. 5A), the CPU 26 does not update the numbering information. When the set number of printed matters as shown in FIG. 5B, the numbering information is incremented one by one like "X001", "X002", "X003", .... Specifically, in such a case, the CPU 26 counts the page numbers of the image data supplied to the image printing device 40 and produces the numbering information on the basis of the counting result. It should be noted that when a new document image data is read, the numbering information is reset to an initial value "X001".

When the document number is selected as shown in FIG. 6A, the numbering information is updated one by one whenever a new document image data is read. When the sheet number (copy number) is selected as shown in FIG. 6B, the numbering information is the page numbers of documents for the first set of documents, and the values serially incremented by the number of sheets of documents for succeeding sets of documents.

Figure 2:
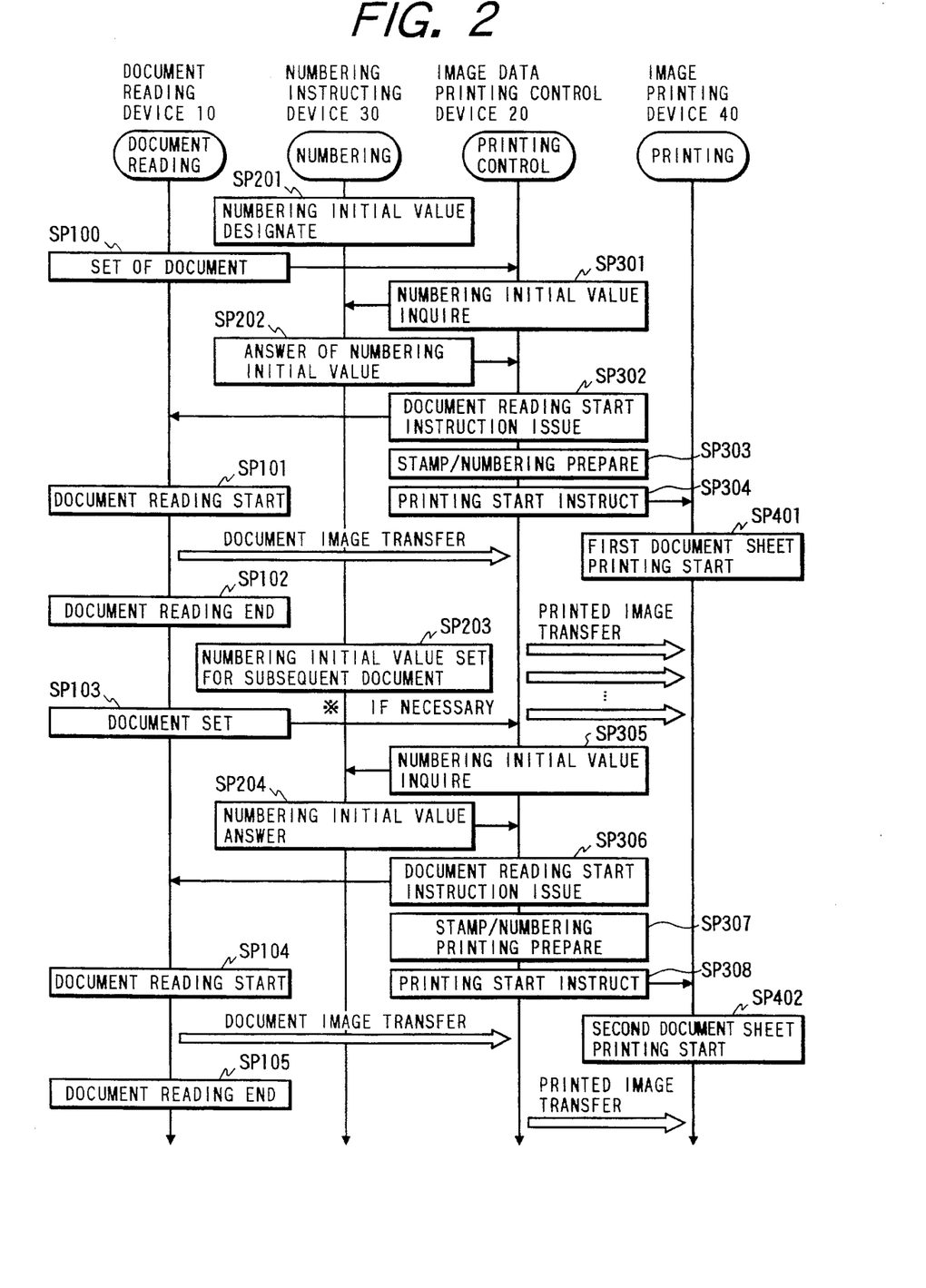
FIG. 2 is a flowchart of the control program according to the embodiment of the invention.

Referring to FIG. 2, a description will be given of the operation of the automatic stamping device according to this embodiment. FIG. 2 shows flowcharts of processing performed in the document reading device 10, printing control device 20, numbering instructing device 30 and image printing device 40.

First, when the kind and initial value of numbering information in the numbering instructing device 30 are set by an operator, the contents thereof are stored in the numbering instructing device 30 (Step SP201). When the first page of documents is set at a prescribed position of the document reading device 10, a notice of this fact is sent to the CPU 26 within the printing control device 20 (Step SP100). A signal inquiring the initial value, etc., of the numbering information is transmitted from the CPU 26 to the numbering instructing device 30 (Step SP301). The inquired information is transferred from the CPU 32 in the numbering instructing device 30 to the CPU 26 (Step SP202).

When the processing in the CPU 26 is advanced to step SP302, the CPU 26 gives an instruction to the document reading device 10 to start to read documents. When such an instruction is supplied to the document reading device 10, the content of the first page is supplied to the image printing control device 20 as a document image data while it is read. Then, the document reading device 10 supplies an image transfer starting signal SD to the image memory 22 before outputting the document image data. Then, the address generator 221 supplies the address signal AD designating the base address to the page memory 222. The address signal AD is incremented at a predetermined period (which is the period of transfer clock of the document image data). Thus, the document image data produced from the document reading device 10 are serially stored in the image memory 22 through the image transfer bus 24.

On the other hand, the processing in the CPU 26 is advanced to step SP303 where preparations of printing of a stamp image data is made. Specifically, the CPU 26 supplies the numbering information (initial value at present) to the stamp DMA controller 211. The stamp DMA controller 211 stores the stamp image data in the stamp memory 213 while reading the font corresponding to the numbering information from the font memory 213. When the stamp image data is completed, a notice of the fact is sent from the stamp DMA controller 211 to the CPU 26. The CPU 26, when it receives this notice, sends a control signal instructing the start of printing to the image printing device 40. On the other hand, upon completion of reading the document, the processing in the document reading device 10 is advanced to step SP102 where a reading completion signal RC is supplied to the printing control device 20.

When the control signal is supplied to the image printing device 40, the processing in the image printing device 40 is advanced to step 401 where the preparation of printing of the first page of the document is made. When the preparation of printing is completed, an image requesting signal RQ is supplied from the image printing device 40 to the printing control device 20. The CPU 26, when it receives the image requesting signal RQ, decides whether or not it has already been received the reading completion signal RC. If it has not yet received the reading completion signal RC, the transfer of the document image data is continued.

When all the image data relative to the first page of documents are transferred from the document reading device 10 to the page memory 222, the reading completion signal RC is supplied to the page memory 222. The CPU 26, when it receives the reading completion signal RC, supplies the control signal starting the reading operation to the stamp DMA controller 211 and address generator 221. In response to this control signal, the address generator 221 makes serial accesses to the page memory 222. Thus, the document image data is serially transferred to the image synthesizing circuit 27 through the image transfer bus 24.

The address generator 221 also supplies the address signal AD to the stamp control circuit 21. The stamp DMA controller 211 monitors the address signal AD and makes an access to the stamp memory 212 in accordance with its value. Specifically, if the address signal AD falls in a predetermined range (address corresponding to the position of sheet of paper where the stamp image should be printed, the corresponding address of the stamp image memory 212 is accessed. Thus, the stamp image data is read from the stamp memory 212 and supplied to the image synthesizing circuit 27.

The image synthesizing circuit 27 superimposes the document image data and stamp image data on each other and supplies the result of superimposing to the image printing device 40 as a printing image data. The image printing device 40 prints the printing image data on the first sheet of paper which will be taken out. Upon completion of preparation of printing for the second sheet of paper in the image printing device 40, the image requesting signal RQ is supplied to the printing control device 20. In response to the image requesting signal RQ, the CPU 26 supplies the numbering information (corresponding to the second set of the first page of documents) to be subsequently printed to the stamp DMA controller 211. Thus, the stamp image data in the stamp memory 212 is updated in accordance with the new numbering information.

Upon completion of updating the stamp image data, the CPU 26 gives an instruction to the stamp DMA controller 211 and address generator 221 to start the reading again. Where it is not necessary to update the stamp image data, in response to the image requesting signal RQ, the CPU 26 immediately outputs the control signal.

In response to the above control signal, the address generator 221 makes an access to the page memory 222 so that the same document image data as produced previously is supplied to the image synthesizing circuit 27. On the other hand, the stamp DMA controller 21 monitors the address signal AD and makes an access to the stamp memory 212 on the basis of the result of monitoring. Thus, the stamp image data corresponding to the second set of the first page of documents is supplied to the image synthesizing circuit 27. When the printing image data is produced from the image synthesizing circuit 27, the image printing device 40 prints the image data on the second sheet of paper.

Thereafter, in a like manner, the printing image data corresponding to the first page of documents is read at the same numbers of times as the necessary number of sets. The stamp image data is updated whenever the image requesting signal RQ is produced from the image printing device 40 and the updated stamp image data is supplied to the image synthesizing circuit 27. As a result, the image data of the first page of documents which is different only in the stamp portion is taken out from the image printing device 40 while it is printed.

While the above printing processing is being performed by the printing control device 20 and image printing device 40, the document reading device 10 and the numbering instructing device 30 perform their individual operations. Upon completion of the processing in step SP102, the processing of the document reading device 10 is advanced to step SP103 where a subsequent document (second page of the documents) is transported to a predetermined position. When such transportation is completed, a notice of this fact is sent to the CPU 26.

On the other hand, upon completion of the processing in step SP202, the processing in the numbering instructing device 30 is advanced to step SP203 where a message instructing to change the initial value of the numbering information is displayed on the operation section 31. In response to this message, the operator can change the initial value of the numbering information by properly operating the operation section 31. The initial value thus changed is stored in the CPU 32.

Upon completion of printing of necessary sets of the first page document, the CPU 26 decides whether or not the notice relative to step SP103 has been received from the document reading device 10. When this notice has been received, the processing is advanced to step SP305. In this step, an inquiry is addressed to the numbering instructing device 30 on whether or not the initial value of the numbering information has been changed. Upon receipt of the inquiry, the processing in numbering instructing device 30 is advanced to step SP204 where an answer about the change of the initial value is sent to the CPU 26. When the initial value is changed, the changed initial value is transmitted to the CPU 26. The subsequent stamp image data will be produced on the changed initial value.

Thereafter, the processing in the printing control device 20 is advanced to step SP306 where the document reading device 10 is instructed to start to read the document. In response to such an instruction, the document reading device 10 supplies the contents of the second page document to the printing control device 20 while reading the second page of documents. The subsequent processing is the same as that for the first page of documents. Namely, the stamp image data and document image data corresponding to each page of the documents will be synthesized and the synthesized image data are serially printed by the image printing device 40.

The present invention should not be limited to the embodiments described above, but may be modified in e.g., the following various embodiments.

(1) In the above embodiment, the frame of the stamp image data was circular, but it may be formed of a square, elliptical or any other shape. With an operator for selecting such a shape being provided on the operation section 31, the CPU 26 can produce the stamp image data of the selected shape to be stored in the stamp image memory 212.

(2) In the above embodiment, the numbering information was the number of sheet of paper (copy number), page number of documents, set number of printed matters or fixed number. But the numbering information should not be limited to these numbers but may be other various kinds of information.

As described above, according to the first aspect of the invention, the stamp images corresponding to the number of documents already read can be automatically printed on sheets of paper. According to the second aspect of the invention, the stamp images corresponding to the number of pages of output image data can be printed on sheets of paper. Therefore, in any structure, the stamp image can be automatically made on a sheet of paper quickly and correctly. Further, according to the third aspect of the invention, since the resetting means resets the counting result of the page number counting means to a predetermined initial value, the stamp images according to "set numbers" are printed on sheets of paper.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An automatic stamping device, comprising:

numbering instructing means for permitting an operator to selectively designate numbering information from any one of plural types of numbering information for a plurality of sheets of documents;

reading means for reading the plurality of sheets of the documents to output document image data;

printing control means, connected to the numbering instructing means and the reading means, for requesting the numbering information from the numbering instructing means, for counting the number of the documents read by the reading means to produce a counting result, and for generating a read control signal;

memory means, connected to the reading means, for storing the document image data output by the reading means;

address generating means for, in response to the read control signal from the printing control means, generating addresses for addressing the memory means to read out the document image data;

stamp image data producing means, connected to receive the numbering information from the printing control means for producing stamp image data, the stamp image data including a frame line with a prescribed shape and a train of characters within said frame line the train of characters being dependent upon the type of numbering information designated by the operator and the counting result produced by the printing control means, the stamp image data producing means monitors the addresses generated by the address generating means and outputs the stamp image data when one of the addresses falls within a predetermined range;

image data synthesizing means, connected to the memory means and the stamp image data producing means, for superimposing said document image data and said stamp image data to produce printing image data; and image data outputting means, connected to the image data synthesizing means for printing the printing image data on sheets of paper.

2. The automatic stamping device according to claim 1, wherein the memory means includes means for serially storing the document image data output from the reading means and means for serially supplying the document image data to the image data synthesizing means to be superimposed with the stamp image data.

3. The automatic stamping device according to claim 1, wherein the types of numbering information include document page number, document set number, copy number, and a fixed number.

4. An automatic stamping device, comprising:

numbering instructing means for permitting an operator to selectively designate numbering information from any one of a plurality of types of numbering information for a document having a number of pages;

reading means for reading successive pages of the document to output document image data;

printing control means, connected to the numbering instructing means and the reading means, for requesting the numbering information from the numbering instructing means, for counting the number of pages of the document image data output by the reading means to produce a counting result and for generating a read control signal;

memory means, connected to the reading means, for storing the document image data output by the reading means;

address generating means for, in response to the read control signal from the printing control means, generating addresses for addressing the memory means to read out the document image data;

stamp image data producing means, connected to receive the numbering information from the printing control means, for producing stamp image data, the stamp image data including a frame line with a prescribed shape and a train of characters within said frame line, the train of characters being dependent upon the type of numbering information designated by the operator and the counting result produced by the printing control means, the stamp image data producing means monitors the addresses generated by the address generating means and outputs the stamp image data when one of the addresses falls within a predetermined range;

image data synthesizing means, connected to the memory means and the stamp image data producing means for superimposing said document image data and said stamp image data to output printing image data; and image data outputting means, connected to the image data synthesizing means, for successively applying printing image data to document pages of paper.

5. The automatic stamping device according to claim 4, further comprising resetting means, connected to the printing control means, for resetting the counting result of said printing control means to a predetermined initial value when a new document is read by said reading means.

6. The automatic stamping device according to claim 2, wherein the memory means includes means for serially storing the document image data output from the reading means and means for serially supplying the document image data to the image data synthesizing means to be superimposed with the stamp image data.

7. The automatic stamping device according to claim 4, wherein the types of numbering information include document page number, document set number, copy number, and a fixed number.

8. An automatic stamping device, comprising:

numbering instructing means for allowing an operator to designate numbering information from a plurality of types of numbering information for a set of documents each having a plurality of pages;

document reading means for reading the pages of the documents and outputting page image data;

printing control means, connected to the numbering instructing means and the document reading means, for requesting the numbering information from the numbering instructing means, for counting the number of pages read by the document reading means to produce a counting result, and for generating a read control signal;

page memory means, connected to the document reading means, for serially storing the page image data output the document reading means;

address generating means for, in response to the read control signal from the printing control means, generating addresses for addressing the page memory means to serially read out the page image data;

stamp image data producing means, connected to receive the numbering information from the printing control means, for producing stamp image data, the stamp image data including a frame line with a prescribed shape and a train of characters within said frame line, the train of characters being dependent upon the type of numbering information designated by the operator and the counting result produced by the printing control means, said stamp image data producing means monitors the addresses generated by the address generating means and outputs the stamp image data when one of the addresses falls within a predetermined range;

image data synthesizing means, connected to the page memory means and the stamp image data producing means, for superimposing the page image data from the page memory means and the stamp image data output from the stamp image data producing means to produce printing image data;

image data outputting means, connected to the image data synthesizing means and the printing control means, for printing the printing image data on sheets of paper; and resetting means for resetting the counting result produced by the printing control means to a predetermined initial value when a new set of documents is read by the document reading means.

9. The automatic stamping device according to claim 8, wherein the types of numbering information include document page number, document set number, copy number, and a fixed number.

* * * * *

UNITED STATES PATENT AND TRADEMARK OFFICE
CERTIFICATE OF CORRECTION

PATENT NO. : 5,601,018
DATED : February 11, 1997
INVENTOR(S) : Tomohiko IIMURA et al.

It is certified that error appears in the above-indentified patent and that said Letters Patent is hereby corrected as shown below:

Claim 1, column 8, line 5, after "means", insert --,--.

Claim 4, column 8, line 44, after "counting result", insert --,--.

Claim 4, column 8, line 67, after "producing means", insert --,--.

Claim 8, column 9, line 38, before "the document", insert --by--.

Signed and Sealed this

Twenty-fourth Day of June, 1997

Attest:

BRUCE LEHMAN

*Attesting Officer*    *Commissioner of Patents and Trademarks*